United States Patent
Keller et al.

(10) Patent No.: US 10,845,267 B2
(45) Date of Patent: Nov. 24, 2020

(54) FATIGUE FUSE MOUNTING SYSTEMS AND METHODS

(71) Applicants: Scott Macklin Keller, Long Beach, CA (US); Kyle Peter Wetzlar, Denver, CO (US)

(72) Inventors: Scott Macklin Keller, Long Beach, CA (US); Kyle Peter Wetzlar, Denver, CO (US)

(73) Assignee: EFS International S.A. (PA)

( * ) Notice: Subject to any disclaimer, the term of this patent is extended or adjusted under 35 U.S.C. 154(b) by 164 days.

(21) Appl. No.: 16/215,363

(22) Filed: Dec. 10, 2018

(65) Prior Publication Data

US 2020/0182738 A1      Jun. 11, 2020

(51) Int. Cl.
    *G01M 5/00*      (2006.01)
(52) U.S. Cl.
    CPC ........ *G01M 5/0033* (2013.01); *G01M 5/0008* (2013.01)
(58) Field of Classification Search
    CPC  G01M 5/0033; G01M 5/0008; H01H 31/127; H01H 9/104
    USPC .................................................. 73/862.046
    See application file for complete search history.

(56) References Cited

U.S. PATENT DOCUMENTS

| | | |
|---|---|---|
| 2,449,883 A | 9/1948 | De Forest |
| 3,979,949 A | 9/1976 | Smith |
| 4,590,804 A | 5/1986 | Brull |
| 4,639,997 A | 2/1987 | Brull |
| 5,012,337 A | 4/1991 | Gillard |
| 5,237,875 A | 8/1993 | de la Veaux |
| 5,319,982 A | 6/1994 | Creager |
| 5,425,274 A | 6/1995 | Creager |
| 5,437,192 A * | 8/1995 | Kawamoto .......... G01N 33/346 73/159 |
| 6,443,018 B1 | 9/2002 | Lee |
| 6,532,825 B1 * | 3/2003 | Abe .................... G01M 5/0033 73/799 |

(Continued)

FOREIGN PATENT DOCUMENTS

WO      2008021946 A2      2/2008

OTHER PUBLICATIONS

Wang, Pengfei, et al. "Early Fatigue Damage Detecting Sensors—A Review and Prospects." Sensors and Actuators A: Physical, vol. 198, Mar. 28, 2013, pp. 46-60., doi:10.1016/j.sna.2013.03.025.

*Primary Examiner* — Octavia Hollington
(74) *Attorney, Agent, or Firm* — Lynch LLP

(57) ABSTRACT

Fatigue fuse mounting systems and methods are discussed in this application. It is advantageous in the field of structural monitoring for fatigue fuses that are engineered to break in sequence to both be mounted near each other and also to work toward ensuring the fatigue fuses all undergo similar load cycling. Simply sticking a set of fatigue fuses to a structure can result in each fatigue fuse from an engineered set undergoing different load cycling, which can reduce their effectiveness. Thus, fatigue fuse mounting systems—and methods of implementing the systems—are contemplated in this application. The system includes a structural frame and a fatigue fuse mounting cartridge. These components work together to ensure that each fatigue fuse in a set undergoes more uniform load cycling, thereby improving structural monitoring performance.

18 Claims, 5 Drawing Sheets

(56) References Cited

U.S. PATENT DOCUMENTS

| | | | |
|---|---|---|---|
| 6,983,660 B2 | 1/2006 | Kwon | |
| 8,746,077 B2 * | 6/2014 | Ozkul | G01M 5/0016 |
| | | | 73/810 |
| 9,423,330 B2 * | 8/2016 | Mary | G01M 5/0066 |
| 2013/0305833 A1 * | 11/2013 | Kittur | G01N 3/32 |
| | | | 73/774 |

* cited by examiner

FATIGUE FUSE MOUNTING SYSTEMS AND METHODS

FIELD OF THE INVENTION

The field of the invention is structural monitoring systems and methods.

BACKGROUND

The background description includes information that may be useful in understanding the present invention. It is not an admission that any of the information provided in this application is prior art or relevant to the presently claimed invention, or that any publication specifically or implicitly referenced is prior art.

As infrastructure ages, it needs to be repaired and replaced. To understand what repairs and replacements are needed for various infrastructure works, it must be understood how those works are deteriorating over time. Thus, a need is born for structural monitoring solutions.

Structural health of a building or infrastructure work requires careful monitoring in key locations, and one way to determine structural health is to monitor how many times that structure experiences a load cycle (e.g., how many times a bridge deforms from a vehicle driving over it, etc.). Once a structure has experienced too many load cycles, its structural health can deteriorate, cracks can form, and catastrophic failure can occur. To monitor how cyclic loading affects different structures, fatigue fuses can be implemented.

A fatigue fuse is a calibrated metal analog sensor designed to measure accumulated fatigue damage in its host structure. The two ends of a fatigue fuse that are attached to a structure of interest have an engineered portion between them. The engineered portion is calibrated to break apart after a certain amount of fatigue damage has accrued (e.g., after a structure experiences a certain number of load cycles). Thus, when it is observed that a fatigue fuse has broken, it can be inferred that the structure that the fatigue fuse was intended to monitor has experienced the requisite number of load cycles for the fatigue fuse to break. This can indicate that the structure should undergo inspection or that it needs repair.

Fatigue fuses are not new. See, Wang, Pengfei, et al. "Early Fatigue Damage Detecting Sensors—A Review and Prospects." *Sensors and Actuators A: Physical*, vol. 198, 28 Mar. 2013, pp. 46-60, doi:10.1016/j.sna.2013.03.025. It has also already been contemplated that an array of fatigue fuses can be used where each fatigue fuse in the array is engineered to break after different amounts of fatigue damage have been accrued by a structure (e.g., after a different number of load cycles have been experienced by each different fatigue fuse). For example, a first fatigue fuse in an array can be engineered to break when a structure needs to be checked for cracks, while a second can be engineered to break when a structure needs repair work, and a third can be engineered to break when a structure is in imminent danger of catastrophic failure.

One challenge associated with affixing a set of differently engineered fatigue fuses to a structure is that it can be difficult to ensure that each fatigue fuse undergoes the same cycling as all the others in the set. When a set of fatigue fuses are intended to be interpreted based on commonly experienced load cycling, it is important that each fatigue fuse experience the same load cycling. So far, no one else has considered how to solve this problem effectively, and thus, there remains a need in the art for new innovations that ensure consistent load cycling across a set of fatigue fuses.

The above-cited reference and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

SUMMARY OF THE INVENTION

The present invention provides apparatuses, systems, and methods of mounting fatigue fuses to structures requiring structural monitoring. In one aspect of the inventive subject matter, a fatigue fuse mounting system is contemplated. The system includes: a first fatigue fuse cartridge portion comprising a set of fatigue fuse mounting components (e.g., threaded rods) configured to enable securing first ends of fatigue fuses from a set of fatigue fuses to the first fatigue fuse cartridge portion; a first mounting frame configured to restrict movement of the first fatigue fuse cartridge portion relative to the first mounting frame; a second fatigue fuse cartridge portion comprising a second set of fatigue fuse mounting components (e.g., threaded rods) configured to enable securing second ends of fatigue fuses from the set of fatigue fuses to the second fatigue fuse cartridge portion; and a second mounting frame configured to restrict movement of the second fatigue fuse cartridge portion relative to the second mounting frame.

In some embodiments, the first mounting frame comprises a first frame component and a second frame component where the first frame component is configured to couple with the second frame component, and the second mounting frame comprises a third frame component and a fourth frame component where the third frame component is configured to couple with the fourth frame component.

In some embodiments, the first fatigue fuse cartridge portion comprises a first component and a second component and the first component is configured to couple with the second component, and wherein the second fatigue fuse cartridge portion comprises a third component and a fourth component and the third component is configured to couple with the fourth component. It is contemplated that the first mounting frame can be coupled with the second mounting frame by at least one rod that is at least partially disposed within both the first mounting frame and the second mounting frame. Additionally, the first mounting frame can include a first coupling slot, and the second mounting frame can include a second coupling slot. The first and second coupling slots of these embodiments are configured to match at least one dimension of the rod such that the rod is at least partially disposed within both the first coupling slot and the second coupling slot, thereby restricting the first and second mounting frames to rectilinear movements relative to each other.

In another aspect of the inventive subject matter, a fatigue fuse cartridge is contemplated. The cartridge includes: a first fatigue fuse cartridge portion comprising a set of fatigue fuse mounting components configured to enable securing first ends of fatigue fuses from a set of fatigue fuses to the first fatigue fuse cartridge portion; the first fatigue fuse cartridge portion configured to be at least partially disposed within a first mounting frame; a second fatigue fuse cartridge portion comprising a second set of fatigue fuse mounting components configured to enable securing second ends of the fatigue fuses from the set of fatigue fuses to the second fatigue fuse cartridge portion; the second fatigue fuse cartridge portion configured to be at least partially disposed within a second mounting frame; a tensioning component that is configured to couple with the first fatigue fuse cartridge portion while braced against the first mounting frame (e.g., either directly or indirectly).

In some embodiments, rotating the rotatable tensioner (e.g., a screw) causes the first fatigue fuse cartridge portion to translate relative to the first mounting frame, which, when the second fatigue fuse cartridge portion is held in place relative to the second mounting frame, pre-tensions the fatigue fuses. In some embodiments, the rotatable tensioner is braced indirectly against the first mounting frame via an end piece that is disposed between the first mounting frame and an end of the rotatable tensioner.

It is contemplated that the first mounting frame is configured to restrict movement of the first fatigue fuse cartridge portion relative to the first mounting frame. In some embodiments the second mounting frame is configured to restrict movement of the second fatigue fuse cartridge portion relative to the second mounting frame (e.g., upon tightening the second mounting frame portions together).

In some embodiments, the first mounting frame is translationally coupled with the second mounting frame by at least one rod that is at least partially within both the first mounting frame and the second mounting frame.

In some embodiments, the set of fatigue fuse mounting components comprises a set of rods to enable securing first ends of the fatigue fuses to the first fatigue fuse cartridge portion, and wherein the second set of fatigue fuse mounting components comprises a second set of rods to enable securing second ends of the fatigue fuses to the second fatigue fuse cartridge portion. In some embodiments, the first and second sets of rods are threaded.

In some embodiments, the first mounting frame is coupled with the second mounting frame by at least one rod that is at least partially disposed within both the first mounting frame and the second mounting frame. It is contemplated that the first mounting frame can include a first coupling slot, and the second mounting frame can include a second coupling slot, where the first and second coupling slots are configured to match at least one dimension of the rod such that the rod is at least partially disposed within both the first coupling slot and the second coupling slot. This restricts the first and second mounting frames to rectilinear movements relative to each other. In some embodiments, the tensioning component comprises a rotatable tensioner.

One should appreciate that the disclosed subject matter provides many advantageous technical effects including a reusable cartridge that makes structural monitoring more consistent. Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
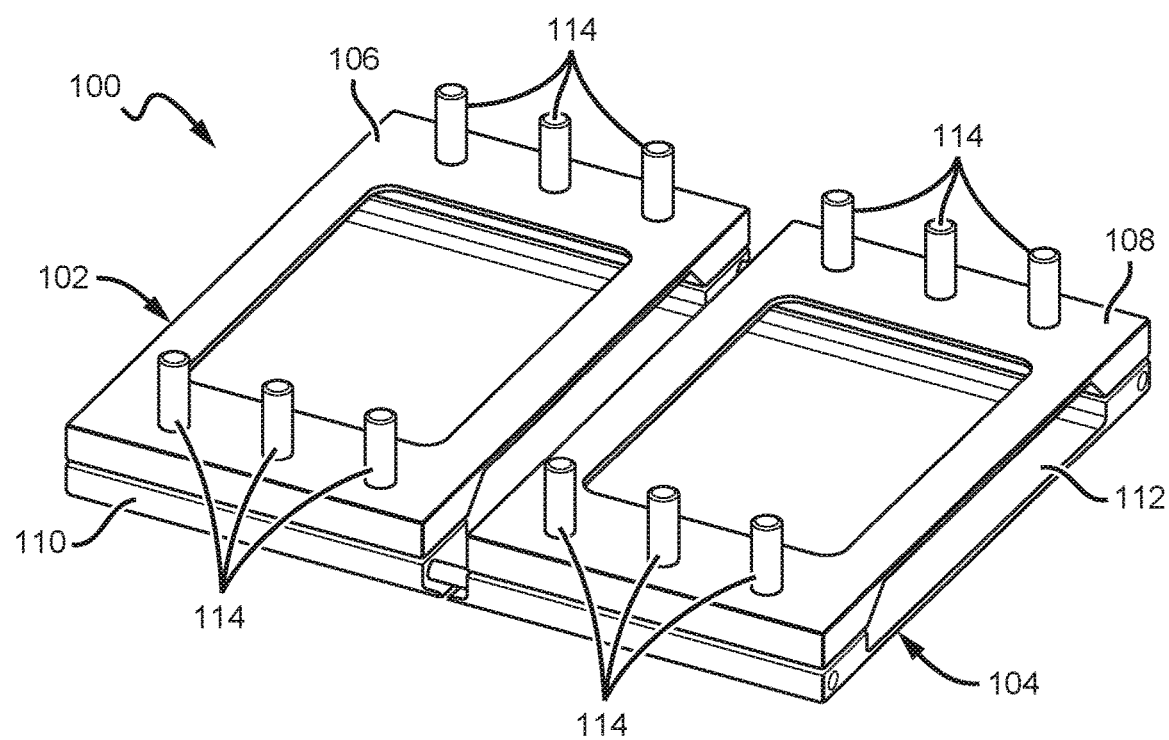
FIG. 1 is a top view of a fatigue fuse mounting system.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Embodiments of the inventive subject matter comprise several components, including a fatigue fuse cartridge, a mounting frame, and a tensioning mechanism. The fatigue fuse cartridge is configured to receive a set of fatigue fuses (e.g., one or more fatigue fuses) and is further configured to couple with both the mounting frame and the tensioning mechanism. All of the figures in this application can be interpreted as showing a single embodiment of the inventive subject matter, although it is contemplated that the features discussed can be included or excluded in various other embodiments.

As mentioned above, the fatigue fuse cartridge is configured to receive a set of fatigue fuses. In sets that include more than one fatigue fuse, the fatigue fuses in the set can all be engineered to break after enduring different quantities of commonly experienced load cycles (e.g., load cycles that are experienced by all of the fatigue fuses in the set). For example, a set of three fatigue fuses could be engineered so that one fatigue fuse breaks after 10,000 load cycles, the next breaks after 20,000 load cycles, and the third breaks after experiencing 30,000 load cycles. In some embodiments, a set of fatigue fuses that are all engineered to break after the same amount of fatigue damage has been accrued can be placed into the fatigue fuse cartridge. This allows devices of the inventive subject matter to be used to measure statistical certainty in an engineered portion of each fuse for that particular fatigue fuse.

When using a set of engineered fatigue fuses for structural monitoring, it is desirable to couple the set to the structure to be monitored in a way that causes the load cycles experienced by the set to be largely similar across each fatigue fuse in the set. Embodiments of the inventive subject matter serve to cause the load cycles experienced by each fatigue fuse in a set to be largely the same. Although it is impossible to completely eliminate any variation in the load cycling experienced between fatigue fuses in a set, the amount of variation can be minimized by embodiments of the inventive subject matter.

A mounting frame 100 is made up of two primary parts: a left side 102 and a right side 104, as demonstrated in FIG. 1 (and although reference numerals for the left side and right side of the mounting frame are not shown in every figure, all of the figures are oriented so that the left side and the right side is consistent with the orientation of mounting frame as shown in FIG. 1). Each side 102, 104 includes both a top portion 106, 108 and a bottom portion 110, 112. The top portions 106, 108 are configured to couple with the corresponding bottom portions 110, 112, and the bottom portions 110, 112 are configured to couple with a structure to be monitored. The bottom portions 110, 112 can be coupled with a structure by, for example, an adhesive, screws, or any fastener known in the art that can withstand the stresses of the load cycling sufficient to transfer mechanical energy to the fatigue fuses when the system is fully installed. It is contemplated that the sides of the bottom portions 110, 112 that are opposite the placement rods 114 are the sides that fasten to a structure to be monitored. The components making up the mounting frame 100 can be made from one or a combination of a variety of materials including metals, alloys, and composite materials. It is contemplated the components of the fatigue fuse mounting system (which includes the mounting frame and the fatigue fuse cartridge), in some embodiments, are designed (by, for example, adjusting thickness, size, material, etc.) so that the cartridge does not itself from deforming during load cycling, and instead transfers substantially all mechanical energy from load cycling into the fatigue fuses.

Figure 5:
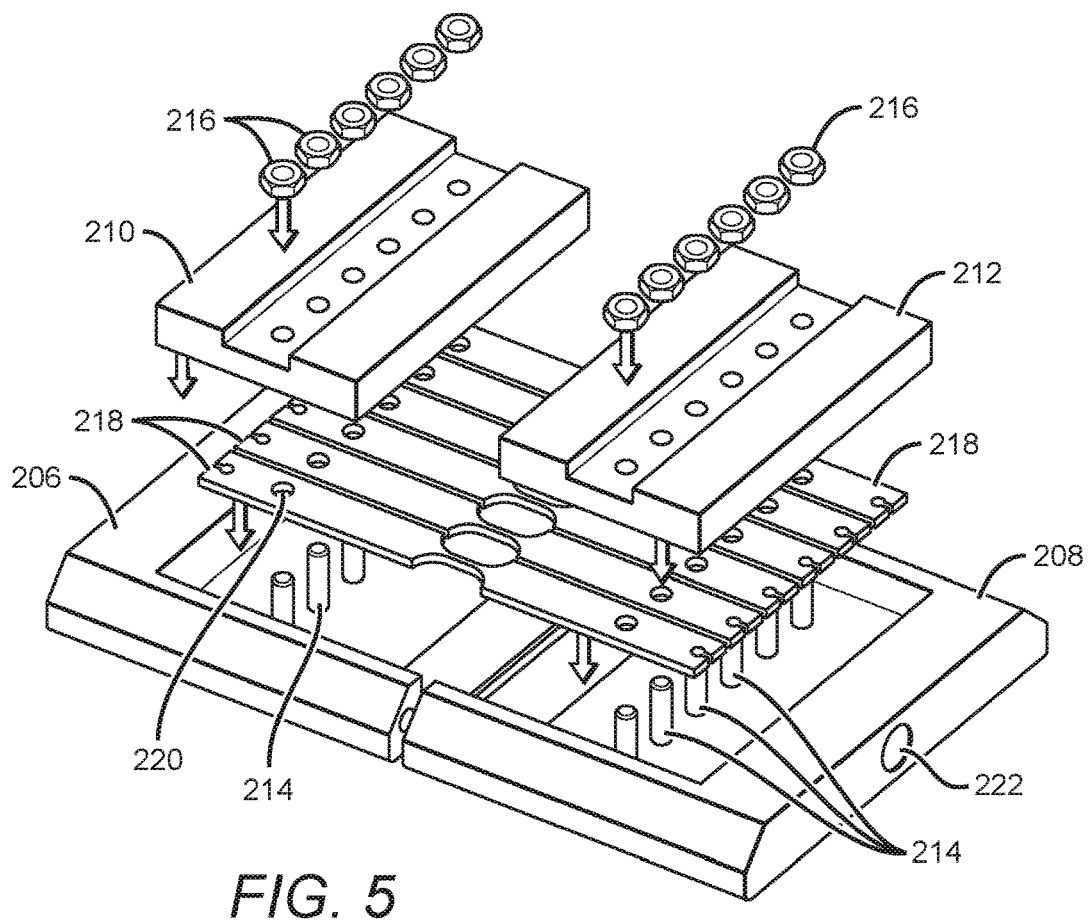
FIG. 5 shows how a fatigue fuse cartridge is assembled.

Each top portion 106, 108 of the mounting frame 100 includes a cutout portion, so that upon coupling to the corresponding bottom portion 110 and 112, respectively, the cutout grants access to the interior of the two top portions 106, 108. This enables an operator to access the fatigue fuse mounting components 214 and associated nuts 216 (e.g., as demonstrated in FIG. 9—reference numerals for these features are shown in FIG. 5 for purposes of clarity and reducing clutter in FIG. 9) even when a top portion of a mounting frame is coupled with a bottom portion.

As shown in FIG. 1, a series of rods 114 are implemented facilitate coupling of the top portions 106, 108 to the bottom portions 110, 112. In some embodiments, the rods 114 can be threaded to accommodate nuts that can tighten the top portions 106, 108 to the bottom portions 110, 112. In these embodiments, the rods 114 can be fixed to the bottom portions 110, 112 so as to prevent movement of the rods 114 relative to the bottom portions 110, 112. The rods 114 can thus act both as guides to ensure the top portions 110, 112 are fastened to the bottom portions 106, 108 in a specific position and orientation, and also as fasteners to hold the top portions 106, 108 to the bottom portions 110, 112.

It is contemplated that the left side 102 and the right side 104 of the mounting frame 100 are designed to be mounted side by side on a structure to be monitored so that the fatigue fuses that span the two sides of a fully assembled system of the inventive subject matter can undergo load cycling resultant from use of the structure (e.g., vehicles passing over a bridge). To ensure the left side 102 and the right side 104 are correctly positioned relative to each other, while still allowing the two sides to move toward and away from teach other (e.g., so that the system can monitor load cycling without undue interference), the two sides 102, 104 are coupled by a set of rods 105, 107. The rods 105, 107 are unthreaded and allow the left side 102 and the right side 104 to move toward and away from each other rectilinearly. The rods 105, 107 both fit at least partially within corresponding slots that are located on the bottom portions 110, 112 of the mounting frame 100. The left side 102 and the right side 104 are shown in the figures at positions relative to each other that are preferred for proper system deployment and function.

Figure 7:
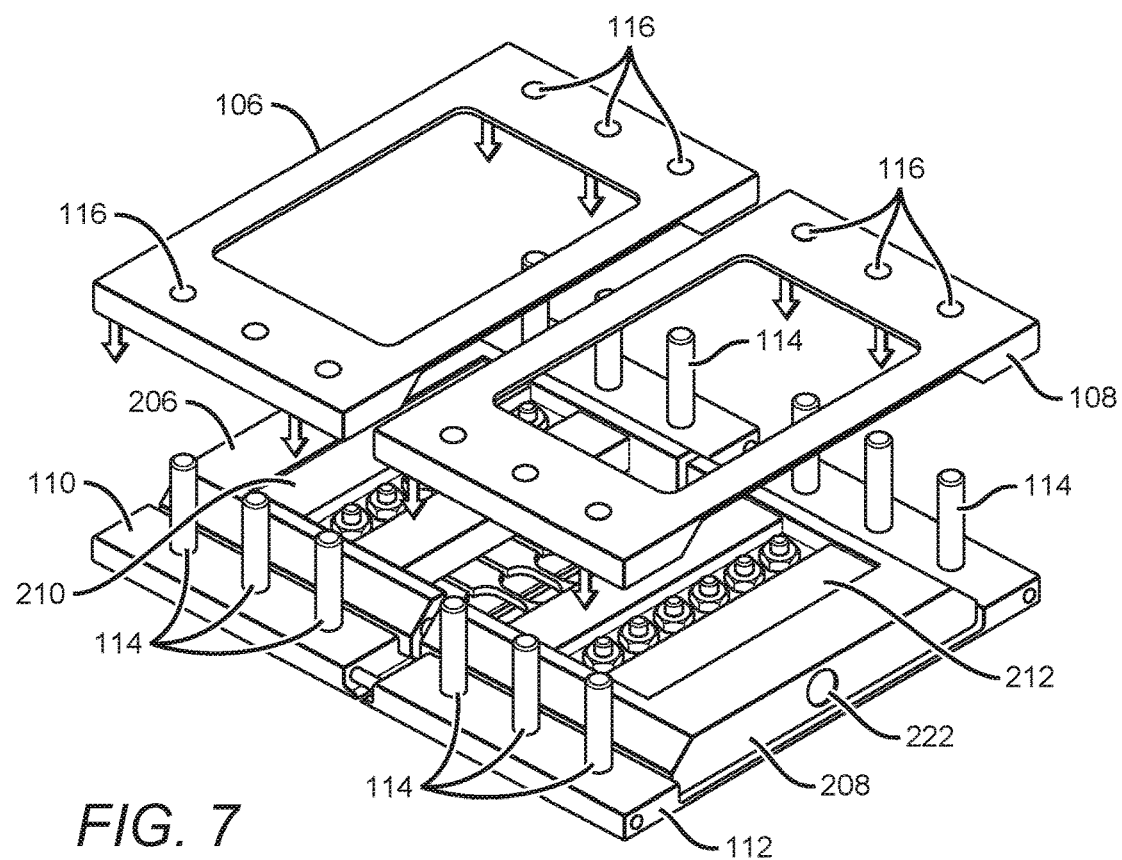
FIG. 7 shows how the top portions of a fatigue fuse mounting frame fit over the fatigue fuse cartridge.

In some embodiments, the top portions 106, 108 and the bottom portions 110, 112 of a mounting frame 100 can be tightened to each other so as to hold the pieces of the fatigue fuse cartridge 200 in place. For this, the top portions 106, 108 and the bottom portions 110, 112 of the mounting frame 100 are placed together over the fatigue fuse cartridge 200 as shown in FIG. 7. Then, either or both of the top portion 106, 108 on one or both sides of the mounting frame 100 can be tightened down to corresponding bottom portions 110, 112. It is contemplated that hand-tightening can be sufficient to facilitate proper alignment of the fatigue fuse cartridge pieces before full tightening. Full tightening of the top portions 106, 108 of the mounting frame 100 to the bottom portions 110, 112 can then be completed on one or both sides (e.g., left 102 or right 104 or both). Tightening a top portion to a bottom portion of the mounting frame 100 is intended to hold the fatigue fuse cartridge 200 in place via friction forces between the mounting frame 100 and the fatigue fuse cartridge (although other aspects of these components can also hold the parts in place, such one or more notches or protrusions).

Figure 9:
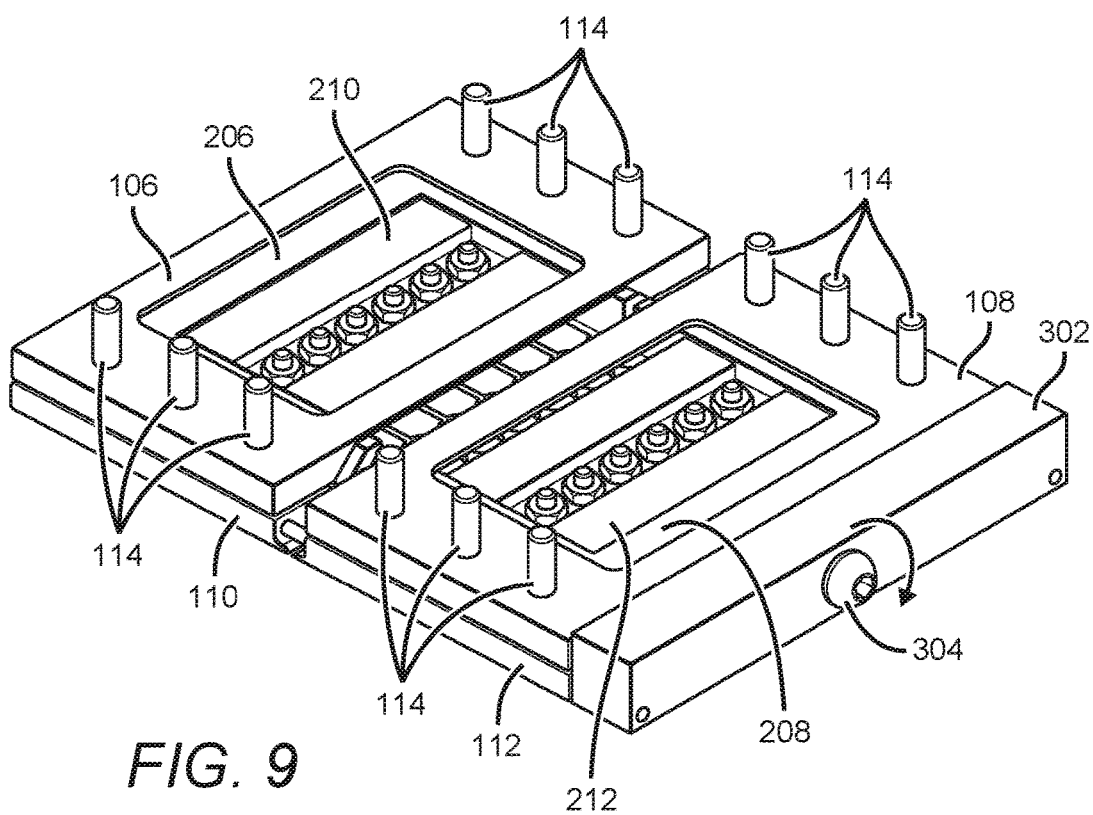
FIG. 9 shows a fully assembled fatigue fuse mounting system.

The top portions 106, 108 of the mounting frame 100 both includes cutouts to facilitate access to the mounting components 214 and nuts 216 of the fatigue fuse cartridge 200 when the top portions are fastened to the bottom portions with the cartridge halves inside them, as shown in FIG. 9. Thus, for example, in embodiments where the fatigue fuse mounting components 214 are set screws, those screws can be tightened (e.g., by turning the screws or by turning nuts on the screws) even after the top portions 106, 108 of the mounting frame 100 have been tightened down to the bottom portions 110, 112 to at least partially contain the fatigue fuse cartridge 200 as shown in FIG. 9.

Figure 3:
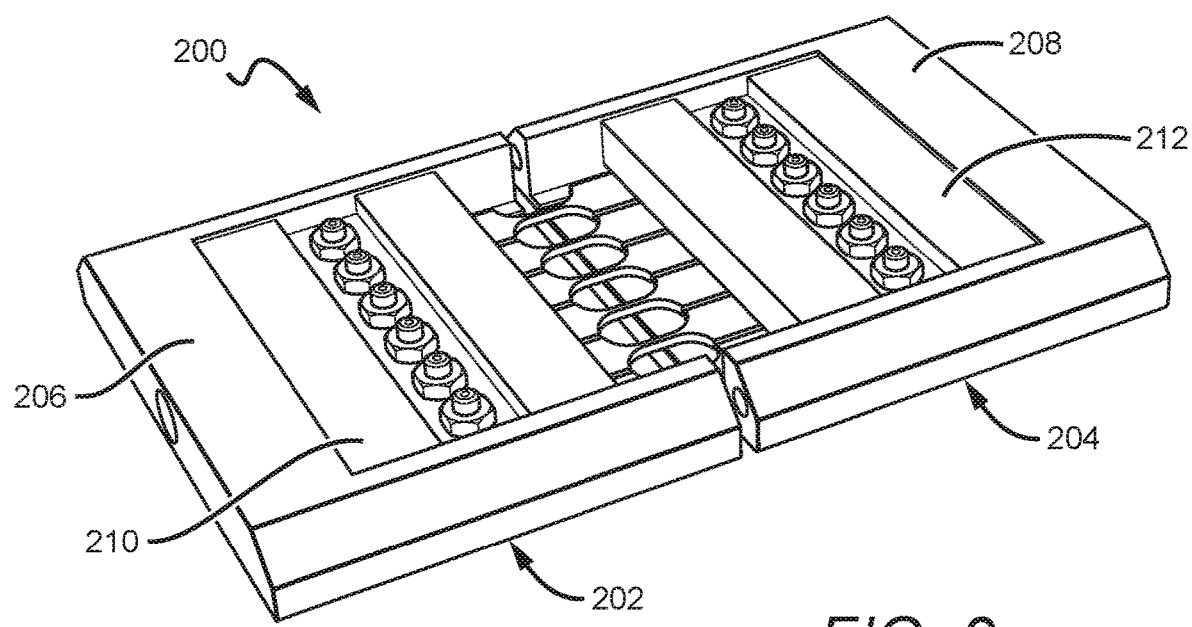
FIG. 3 is a perspective view of the fatigue fuse cartridge of FIG. 1.
Figure 2:
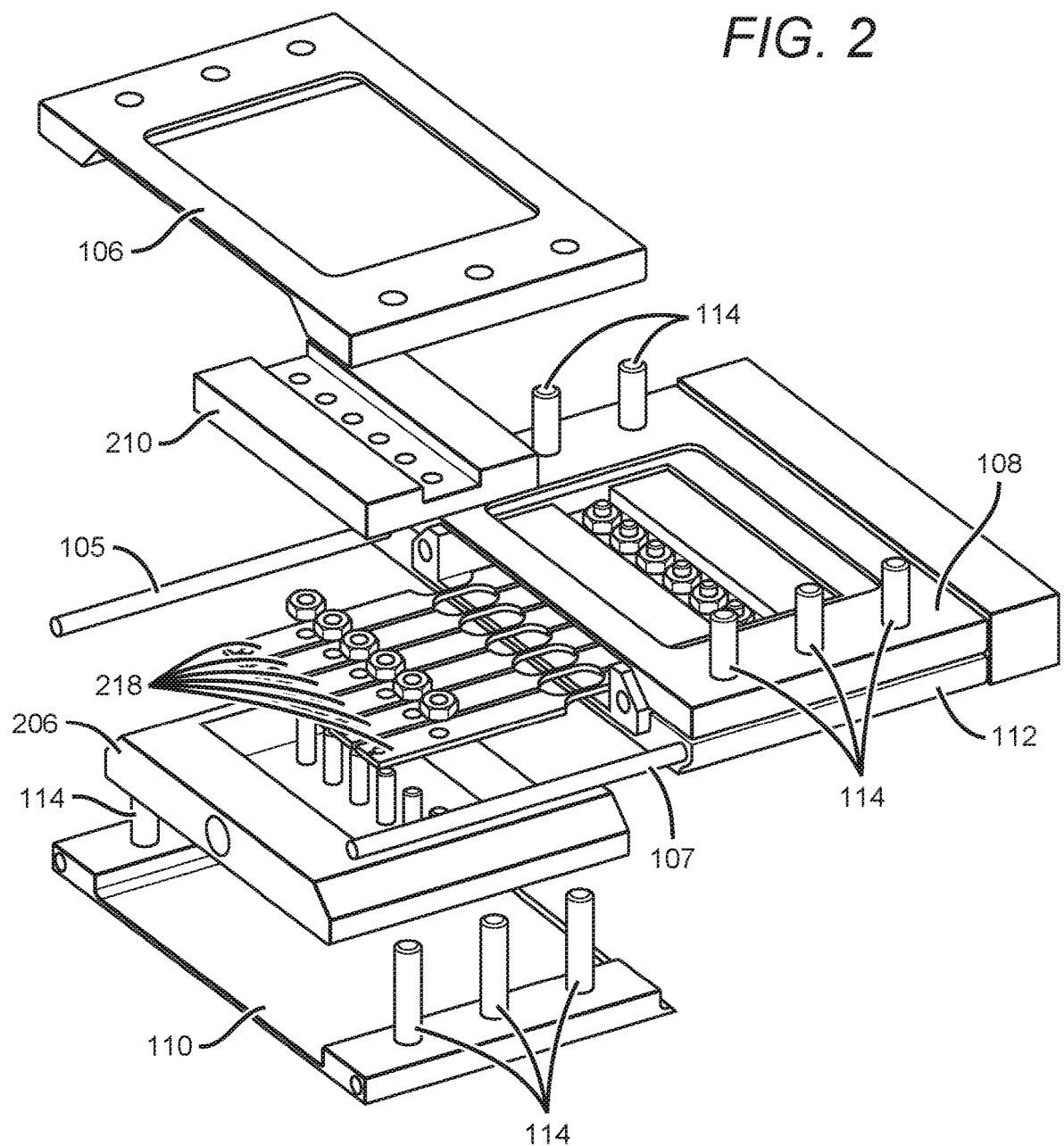
FIG. 2 is an exploded view of the fatigue fuse mounting system of FIG. 1.

The fatigue fuse cartridge 200, like the mounting frame 100, also includes two key portions: a left side 202 and a right side 204 as shown in FIG. 3. Each side 202, 204 includes at least two components: a bottom component 206, 208 and a top component 210, 212, where each top component 210, 212 couples with the corresponding bottom component 206, 208 (respectively). The bottom components 206, 208 include fatigue fuse mounting components 214 that are configured to hold the fatigue fuses in place. It is contemplated that, in some embodiments, the mounting components 214 can be included with the top components 210, 212. In embodiments where the fatigue fuse mounting components 214 are included with the top components 210, 212, the fatigue fuse mounting components 214 are set screw that can be tightened down by, for example, turning the nuts 216. When tightened down, the fatigue fuse mounting components 214 press against ends of fatigue fuses 218 to hold them in place relative to the fatigue fuse cartridge 200. In other embodiments the fatigue fuse mounting components 214 can screw into the top portions 210, 212 to couple the bottom portions 206, 208 to the top portions 210, 212. In some embodiments (as shown in the figures), the fatigue fuses 218 can include through-holes 220 on their ends (or other cutout features that accomplish the same thing) that the fatigue fuse mounting components 214 can pass through to contribute to both holding the fatigue fuses in place and also holding the top portions 210, 212 of the fatigue fuse cartridge 200 to the bottom portions 206, 208.

The top portions 210, 212 of the fatigue fuse cartridge 200 can be coupled with the bottom portions 206, 208 by a variety of means. For example, they can be clamped down by a quick release mechanism, they can be screwed down (e.g., by a combination of the fatigue fuse mounting components 214 and corresponding nuts 216 as shown in FIG. 5), they can be held in place by the top portions 106, 108 of the mounting frame when they are tightened down to the bottom portions 110, 112.

It is contemplated that the fatigue fuse cartridge's top portions 206, 208 can couple additionally or alternatively with the bottom portions 210, 212 by, for example, hinges. In some embodiments, the system can include one or more quick-release mechanisms to clamp the top portions 206, 208 to the bottom portions 210, 212 of the fatigue fuse cartridge 200 to compress the ends of the fatigue fuses 218 to hold them in place relative to the fatigue fuse cartridge 200.

Figure 8:
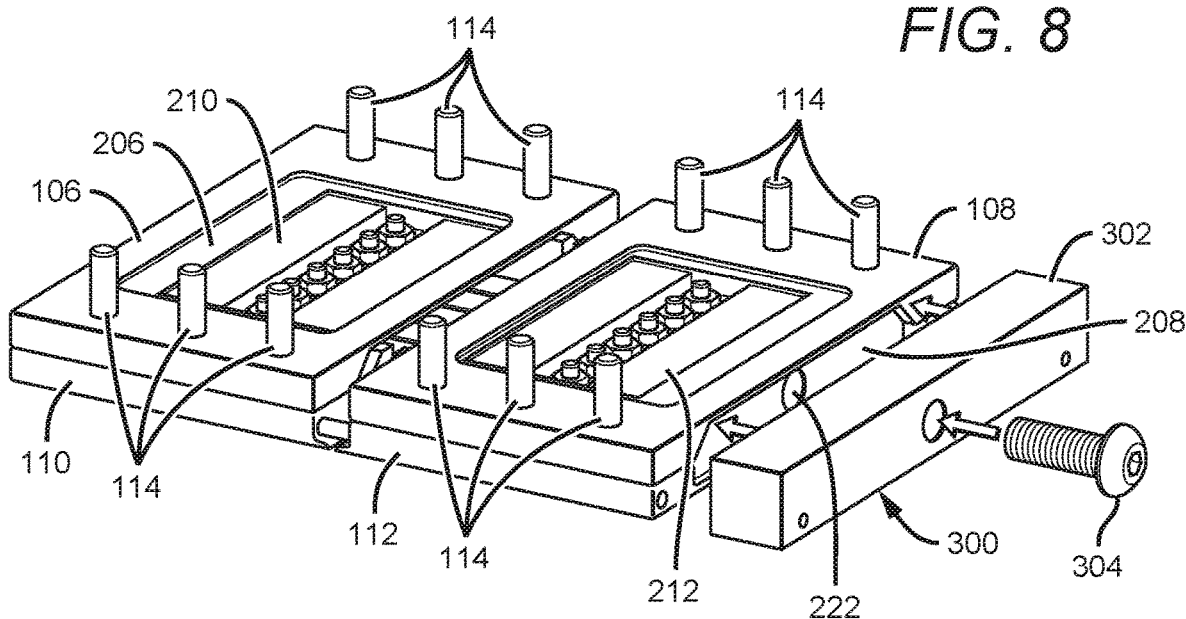
FIG. 8 is a perspective view of the fatigue fuse mounting system of FIG. 1 with tensioning components exploded out.

The top portions 206, 208 of the cartridge 200 can be coupled with the bottom portions 210, 212 by a variety of means. For example, it can be clamped down by a quick release mechanism, it can be screwed down (e.g., using threaded rods and nuts), it can be held in place by the top portion of a mounting frame when it's tightened down to the bottom portion of the mounting frame, etc. It is contemplated that the side of the fatigue fuse cartridge 200 that does not couple with the tensioning mechanism 300 (e.g., the left side 202 as shown in FIGS. 8 & 9) is held in place relative to the mounting frame 100 by tightening that side (e.g., the left side 102 as shown in FIGS. 8 & 9) of the mounting frame (e.g., by tightening the top, left portion 106 of the mounting frame to the bottom, left portion 110).

As mentioned above, it is contemplated that the top 210, 212 and bottom portions 206, 208 of a fatigue fuse cartridge's two sides 202, 204 can be fastened to each other to hold the fatigue fuses 218 in place relative to the cartridge 200. A fully assembled cartridge can be seen in FIG. 3. For this configuration, the top and bottom portions 206, 208, 210, & 212 of the fatigue fuse cartridge 200 are arranged (e.g., the top portions are coupled with the corresponding bottom portions) as shown in FIG. 3, and then the top portions 106, 108 of the mounting frame 100 are arranged over the corresponding bottom portions 110, 112 so as to contain the two sides 202, 204 of the cartridge 200 at least partially within the two sides 102, 104 of the mounting frame 100, as shown in FIGS. 8 & 9.

In addition to the mounting frame 100 and the fatigue fuse cartridge 200, systems of the inventive subject matter can include a tensioning mechanism 300. The tensioning mechanism 300 is included so that a set of fatigue fuses held by the cartridge 200 can have tension applied to them so that each fatigue fuse in a set of fatigue fuses undergoes the desired load cycling based on the load cycles experienced at the portion of the structure that is being monitored. The tensioning mechanism, as shown in FIG. 8, among others, includes a set screw 302 and a spacer 304. It is contemplated that the spacer can be omitted, depending on the configuration of the mounting frame 200 (e.g., if the ends of the right side of the mounting frame as shown in FIG. 8 are elongated away from the middle of system such that the space created within the top portion 108 and the bottom portion 112 allows the right side 204 of the fatigue fuse cartridge 200 to translate to the right (e.g., away from the opposite side, as shown in the figures) sufficient for tensioning. In such a configuration, the set screw 302 would then brace against the right side of the mounting frame 104 instead of against a spacer (e.g., spacer 304 as shown in the figures).

When a system of the inventive subject matter is assembled to the point that the left side of the system is tightened to prevent the left side 102 of the cartridge 100 from moving relative to the left side 202 of the mounting frame 200 (e.g., while the bottom portions 110, 112 of the mounting frame 100 are affixed to a structure to be monitored), and the right side 104 of the mounting frame 100 is not yet tightened to prevent movement of the right side 204 of the cartridge 200 relative to the right side 104 of the mounting frame 100, the tensioning mechanism 300 can be used to pre-tension the set of fatigue fuses by turning the set screw 302. The set screw 302 braces against the spacer 304 and, as it is turned, it pulls the right side 204 of the fatigue fuse cartridge 200 away from the left side 202 of the fatigue fuse cartridge 200, thereby tensioning the fatigue fuses 218 that span between the two sides of the fatigue fuse cartridge 200.

An example of the fatigue fuse cartridge 200 that is held in place by the mounting frame 100 can be seen in FIGS. 8 & 9. By having the left side 202 of the fatigue fuse cartridge 200 held in place relative to the mounting frame 100 by friction forces brought about by tightening the left side top portion 106 of the mounting frame 100 to the left side bottom portion 110 of the mounting frame, the set screw 302 of the tensioning mechanism 300 can then pull on the fatigue fuses 218 that are anchored on the opposite side (e.g., the left side as seen in the figures). This can be accomplished, for example, when both sides of the mounting frame are affixed to the structure to be monitored.

Figure 4:
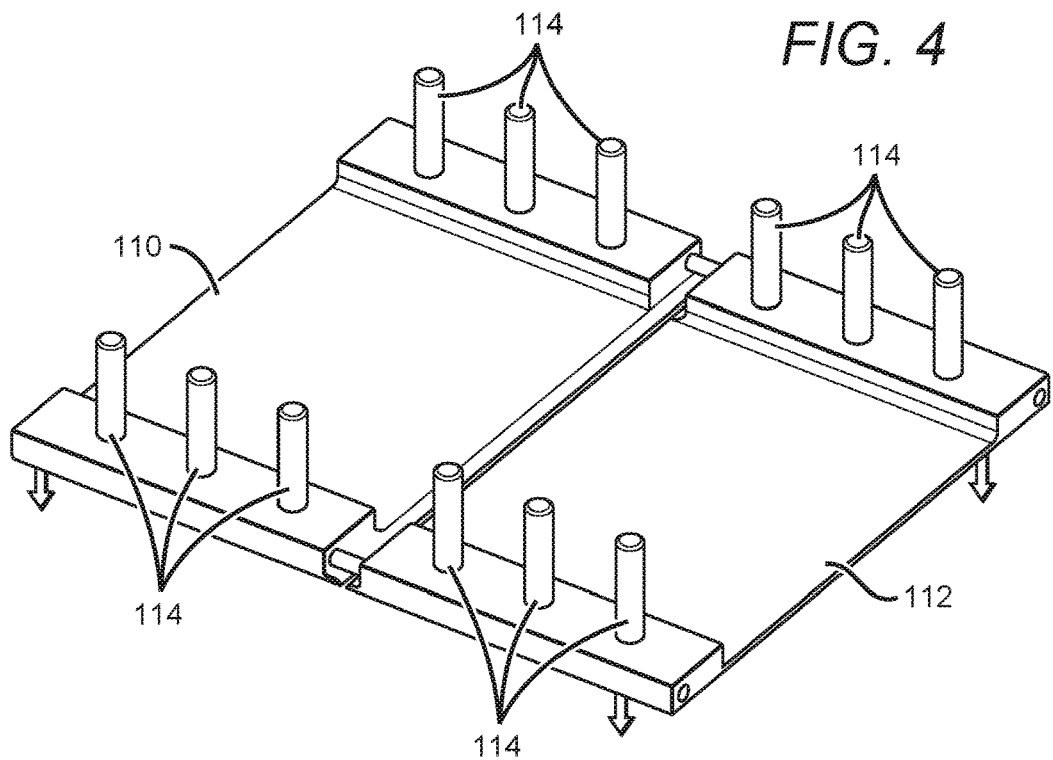
FIG. 4 shows the bottom portions of the mounting frame of the fatigue fuse mounting system of FIG. 1.

Examples of how systems of the inventive subject matter can be installed and used are described below. In one embodiment, several steps can be undertaken that are related to installation and use of a fatigue fuse mounting system. It is contemplated that not all of these steps must be completed in order according to how they are described, and common sense may dictate order of execution. In one step, the bottom portions of the mounting frame 100 (e.g., both the left side 102 and right side 104) are affixed to a structure to be monitored, as shown in FIG. 4 (the downward facing arrows demonstrate how the system is placed onto a structure such that the bottoms of the bottom portions 110, 112 of the mounting frame 100 are affixed to the structure). The location on the structure to which the bottom portions 110, 112 are affixed—and the orientation in which they are affixed—can be determined based on an amount, magnitude, and vectors of load cycling that is anticipated to be experienced in that particular location. For example, it can be advantageous to mount a system of the inventive subject matter in a location that is anticipated to be a failure point earlier than other locations on the structure. For additional structural monitoring, it is contemplated that more than one system of the inventive subject matter can be placed in more than one location on a structure to monitor the structural health of multiple locations simultaneously.

It is contemplated that the bottom portions 110, 112 of the mounting frame 100 can be affixed to the structure to be monitored by a variety of means. In some embodiments, an adhesive is used (e.g., an epoxy), while in other embodiments, fasteners (e.g., screws) can be used. When screws are used to affix the bottom portions of the mounting frame to the structure to be monitored, it is contemplated that pilot holes can be drilled for the screws to be driven into. But an adhesive such as an epoxy is preferable since it is less likely to affect the behavior of load cycling by avoiding the introduction of pilot holes that can act as stress concentrators in the structure. Ultimately, an adhesive minimizes movement of either side of the fatigue fuse mounting system relative to the portion of the structure that it is affixed to.

Figure 6:
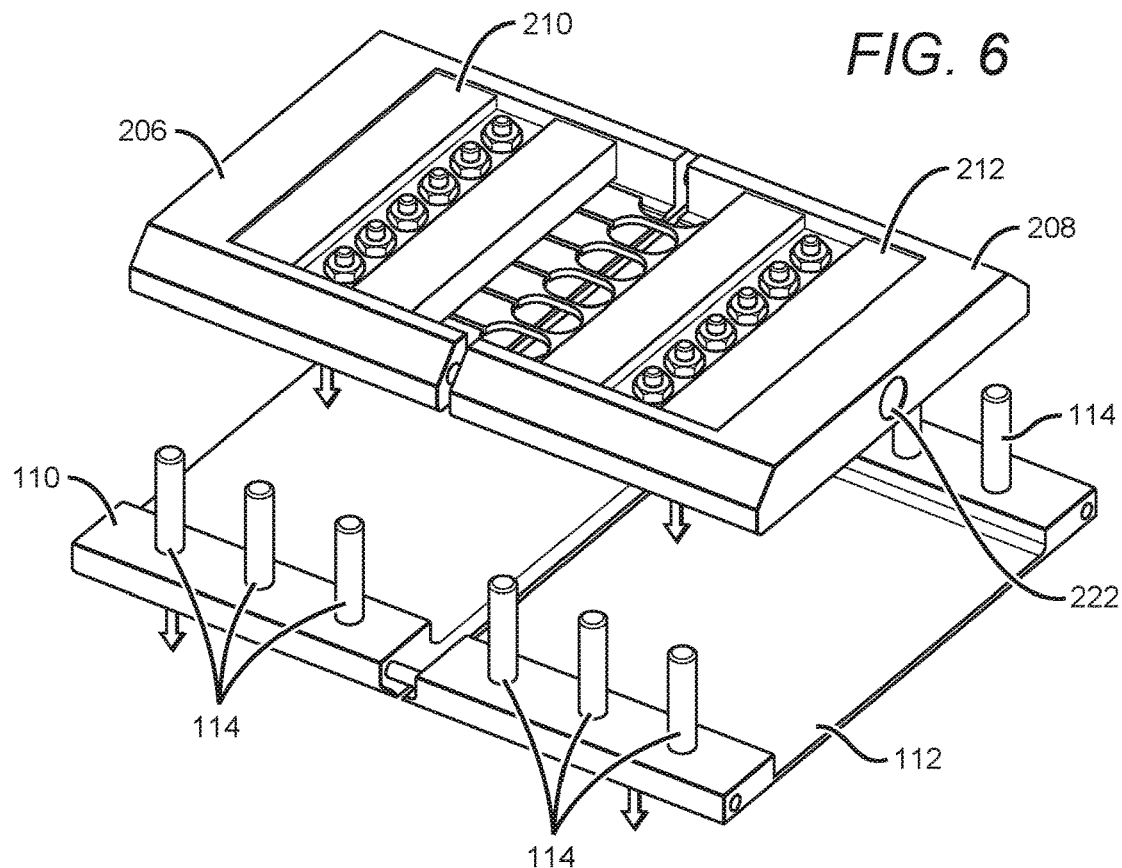
FIG. 6 shows how a fatigue fuse cartridge fits into the bottom portions of a mounting frame.

With the bottom portions 110, 112 of the mounting frame 100 affixed to the structure to be monitored, the fatigue fuse cartridge 200 is put into place as shown in FIG. 6. Before the fatigue fuse cartridge 200 can be put in place relative to the bottom portions 110, 112 of the mounting frame, the fatigue fuse cartridge 200 must be assembled with a set of fatigue fuses installed. It is contemplated that one or more fatigue fuses may be included in a set of fatigue fuses in any embodiment of the inventive subject matter.

As shown in FIG. 5, the fatigue fuses 218 in the set of fatigue fuses are placed into the fatigue fuse cartridge 200 such that the placement rods 214 on both sides of the cartridge 200 pass through the through-holes 220 in the fatigue fuses. This ensures proper placement of the fatigue fuses 218 relative to the different portions of the cartridge 200. It is contemplated that, in some embodiments, the fatigue fuses 218 do not have these through holes and instead are held in place by a combination of set screws and pressure from tightening other components of the system.

Next, the top portions 210, 212 are placed over the same placement rods 214, and the placement nuts 216 are tightened down onto the top portions 210, 212. In some embodiments, no top portion is incorporated and instead the placement nuts tighten directly down onto the end portions of each fatigue fuse. The top portions 210, 212 of the cartridge 200 can be advantageous, though, since they serve to spread the pressure caused by tightening the placement nuts 216 over a larger surface area, thereby reducing any potential impact on the performance of the fatigue fuses 218.

With the cartridge 200 assembled, it is then put into position relative to the bottom portions 110, 112 of the mounting frame 100 after the bottom portions 110, 112 mounting frame 100 have been affixed to a surface of a structure to be monitored, as shown in FIG. 6. Once in place, the top portions 106, 108 of the mounting frame 100 are placed over the cartridge 200 and coupled with the bottom portions 110, 112 of the mounting frame 100, as shown in FIG. 7. The top portions include through-holes 116 that are positioned to correspond to the set of corresponding threaded placement rods 114. Once in place, the top portions 106, 108 can be tightened down onto the bottom portions 110, 112 by nuts that turn down onto the threaded placement rods. In some embodiments, the holes 116 that the threaded rods pass through are themselves threaded so that the threaded rods can be turned to pull the top portions 106, 108 can be tightened down to the bottom portions 110, 112 of the mounting frame 100.

Before tightening the top portions 106, 108 of the mounting frame 100 to the bottom portions 110, 112, the top portions 106, 108 are first hand-tightened to the bottom portions 110, 112. This allows for adjustment and movement of the cartridge 200 to ensure proper placement and alignment. Thus, while the top portions 106, 108 are hand-tightened to the bottom portions 110, 112, the tensioning mechanism 300 can then be introduced, as shown in FIG. 8. The tensioning mechanism 300 can also be introduced after fully tightening the side of the system that is opposite the side that the tensioning mechanism is to be coupled with (as shown in the figures, the left side can be fully tightened before introducing the tensioning mechanism on the right side). The tensioning mechanism 300, which includes two components (a set screw 302 and a spacer 304), is thus put into position and also hand tightened such that the set screw 302 couples with a threaded hole 222 on an end of the fatigue fuse cartridge 200.

With all of the components in place, as shown in FIG. 9, the side of the mounting frame opposite the tensioning mechanism can then be fully tightened (e.g., the left top portion 106 is tightened to the left bottom portion 110) so that the corresponding side of the fatigue fuse cartridge is held in place (e.g., the left side 202 of the fatigue fuse cartridge 200 is contained at least partially within the left side 102 of the mounting frame 100). Next, the set screw 304 of the tensioning mechanism 300, which couples with the right, bottom portion 208 of the cartridge 200 through the spacer 302 as shown in FIG. 9, is turned. Turning the set screw 302, which is threaded into the threaded hole 222 on the right, bottom portion 208 of the cartridge 200, pulls the right side 204 of the fatigue fuse cartridge 200 away from the left side 202 of the fatigue fuse cartridge. This applies tension to the fatigue fuses 218, which enables the fatigue fuses 218 to operate nominally. Finally, with tension applied to the fatigue fuses 218 via the tensioning mechanism 300, the right side 104 of the mounting frame 100 can then be tightened down such that the right side 204 of the fatigue fuse cartridge 200 is held in place and no longer relies in whole or in part on the tensioning mechanism 300 to maintain its position relative to the right side 104 of the mounting frame 100.

Once these steps are completed, the fatigue fuses 218 from the set of fatigue fuses are ready for periodic observation to facilitate monitoring the health of the structure to which the system has been affixed.

Thus, specific systems and methods of fatigue fuse mounting have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A fatigue fuse mounting system comprising:
a first fatigue fuse cartridge portion comprising a set of fatigue fuse mounting components configured to enable securing first ends of fatigue fuses from a set of fatigue fuses to the first fatigue fuse cartridge portion;
a first mounting frame configured to restrict movement of the first fatigue fuse cartridge portion relative to the first mounting frame;
a second fatigue fuse cartridge portion comprising a second set of fatigue fuse mounting components configured to enable securing second ends of fatigue fuses from the set of fatigue fuses to the second fatigue fuse cartridge portion; and
a second mounting frame configured to restrict movement of the second fatigue fuse cartridge portion relative to the second mounting frame.

2. The system of claim 1, wherein the first mounting frame comprises a first frame component and a second frame component and the first frame component is configured to couple with the second frame component, and wherein the second mounting frame comprises a third frame component and a fourth frame component and the third frame component is configured to couple with the fourth frame component.

3. The system of claim 1, wherein the first fatigue fuse cartridge portion comprises a first component and a second component and the first component is configured to couple with the second component, and wherein the second fatigue fuse cartridge portion comprises a third component and a fourth component and the third component is configured to couple with the fourth component.

4. The system of claim 1, wherein the first mounting frame is coupled with the second mounting frame by at least one rod that is at least partially disposed within both the first mounting frame and the second mounting frame.

5. The system of claim 4, wherein the first mounting frame further comprises a first coupling slot, and the second mounting frame further comprises a second coupling slot, wherein the first and second coupling slots are configured to match at least one dimension of the rod such that the rod is at least partially disposed within both the first coupling slot and the second coupling slot, thereby restricting the first and second mounting frames to rectilinear movements relative to each other.

6. The system of claim 1, wherein the set of fatigue fuse mounting components comprises a set of rods that are at least partially threaded, and wherein the second set of fatigue fuse mounting components comprises a second set of rods that are at least partially threaded.

7. A fatigue fuse cartridge comprising:
a first fatigue fuse cartridge portion comprising a set of fatigue fuse mounting components configured to enable securing first ends of fatigue fuses from a set of fatigue fuses to the first fatigue fuse cartridge portion;
the first fatigue fuse cartridge portion configured to be at least partially disposed within a first mounting frame;
a second fatigue fuse cartridge portion comprising a second set of fatigue fuse mounting components configured to enable securing second ends of the fatigue fuses from the set of fatigue fuses to the second fatigue fuse cartridge portion;
the second fatigue fuse cartridge portion configured to be at least partially disposed within a second mounting frame;
a tensioning component that is configured to couple with the first fatigue fuse cartridge portion while braced against the first mounting frame.

8. The system of claim 7, wherein rotating the rotatable tensioner causes the first fatigue fuse cartridge portion to translate relative to the first mounting frame.

9. The system of claim 7, wherein the rotatable tensioner is braced indirectly against the first mounting frame via an end piece that is disposed between the first mounting frame and an end of the rotatable tensioner.

10. The system of claim 7, wherein the rotatable tensioner comprises at least one of a screw, a nut, and a bolt.

11. The system of claim 7, wherein the first mounting frame is configured to restrict movement of the first fatigue fuse cartridge portion relative to the first mounting frame.

12. The system of claim 7, wherein the second mounting frame is configured to restrict movement of the second fatigue fuse cartridge portion relative to the second mounting frame.

13. The system of claim 7, wherein the first mounting frame is translationally coupled with the second mounting frame by at least one rod that is at least partially within both the first mounting frame and the second mounting frame.

14. The system of claim 7, wherein the set of fatigue fuse mounting components comprises a set of rods to enable securing first ends of the fatigue fuses to the first fatigue fuse cartridge portion, and wherein the second set of fatigue fuse mounting components comprises a second set of rods to enable securing second ends of the fatigue fuses to the second fatigue fuse cartridge portion.

15. The system of claim 14, wherein the first and second sets of rods are threaded.

16. The system of claim 7, wherein the first mounting frame is coupled with the second mounting frame by at least one rod that is at least partially disposed within both the first mounting frame and the second mounting frame.

17. The system of claim 16, wherein the first mounting frame further comprises a first coupling slot, and the second mounting frame further comprises a second coupling slot, wherein the first and second coupling slots are configured to match at least one dimension of the rod such that the rod is at least partially disposed within both the first coupling slot and the second coupling slot, thereby restricting the first and second mounting frames to rectilinear movements relative to each other.

18. The system of claim 7, wherein the tensioning component comprises a rotatable tensioner.

* * * * *